United States Patent
Ramasamy

(10) Patent No.: US 10,802,667 B1
(45) Date of Patent: Oct. 13, 2020

(54) TACTILE RESPONSE FOR USER INTERACTION WITH A THREE DIMENSIONAL RENDERING

(71) Applicant: Bank of America Corporation, Charlotte, NC (US)

(72) Inventor: Suki Ramasamy, Chennai (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/430,017

(22) Filed: Jun. 3, 2019

(51) Int. Cl.
| G06F 3/0482 | (2013.01) |
| G06F 3/0481 | (2013.01) |
| G06F 3/0488 | (2013.01) |
| G06F 3/01 | (2006.01) |
| G06F 3/0484 | (2013.01) |

(52) U.S. Cl.
CPC .......... G06F 3/04815 (2013.01); G06F 3/016 (2013.01); G06F 3/0482 (2013.01); G06F 3/0488 (2013.01); G06F 3/04847 (2013.01)

(58) Field of Classification Search
CPC ..... G06F 3/016; G06F 3/0482; G06F 3/04847
See application file for complete search history.

(56) References Cited

U.S. PATENT DOCUMENTS

| 8,279,053 | B2 | 10/2012 | Ryu et al. |
| 8,531,319 | B2 | 9/2013 | Ku et al. |
| 9,483,868 | B1 | 11/2016 | Tang |
| 9,658,688 | B2 | 5/2017 | Shen et al. |
| 2011/0096006 | A1* | 4/2011 | Jeong ............ G06F 3/0488 345/173 |
| 2011/0260996 | A1 | 10/2011 | Henricson |
| 2011/0281619 | A1* | 11/2011 | Cho ............ G06F 3/04817 455/566 |
| 2012/0062549 | A1* | 3/2012 | Woo ............ G06F 3/04815 345/419 |
| 2013/0069938 | A1 | 3/2013 | Kim |
| 2013/0326340 | A1* | 12/2013 | Woo ............ G06F 3/0484 715/243 |
| 2014/0201666 | A1* | 7/2014 | Bedikian ......... G06F 3/017 715/771 |
| 2014/0232634 | A1 | 8/2014 | Piemonte et al. |
| 2015/0082145 | A1 | 3/2015 | Ames et al. |
| 2015/0338998 | A1 | 11/2015 | Chathoth et al. |

(Continued)

*Primary Examiner* — David E Choi
(74) *Attorney, Agent, or Firm* — Banner & Witcoff, Ltd.; Michael A. Springs

(57) ABSTRACT

A three dimensional user experience for mobile applications includes adjusting display of simulated three dimensional objects in real time and providing tactile feedback based on user interaction. A mobile application identifies a user viewing angle of a user and an orientation of the mobile device. An image analyze calibrates coordinates of the user with respect to the mobile device position and calculates pitch and roll elements of the simulated three dimensional objects with respect to a mobile device coordinate system. Based on rotational element, images are selected and/or rendered for display in real time. The mobile application analyzes an area of contact with a touchscreen and identify an edge of a selected simulated three dimensional object based on a color or color gradient. Based on a type of object and an edge type, tactile feedback is generated by triggering a vibration motor to execute a particular vibration pattern.

18 Claims, 8 Drawing Sheets

(56) References Cited

U.S. PATENT DOCUMENTS

| | | |
|---|---|---|
| 2017/0075502 A1 | 3/2017 | Kurz |
| 2017/0255648 A1* | 9/2017 | Dube .................... G06F 16/583 |
| 2018/0039331 A1* | 2/2018 | Warren .................. G06F 3/016 |
| 2018/0129409 A1* | 5/2018 | Lim ..................... G06F 3/04883 |
| 2019/0012806 A1 | 1/2019 | Lehmann et al. |
| 2019/0116452 A1* | 4/2019 | Shi .......................... G06F 3/167 |

* cited by examiner

US 10,802,667 B1

TACTILE RESPONSE FOR USER INTERACTION WITH A THREE DIMENSIONAL RENDERING

CROSS REFERENCE TO RELATED APPLICATIONS

This application is related to concurrently filed U.S. application Ser. No. 16/429,881, filed Jun. 3, 2019 and entitled, "Three Dimensional Rendering for a Mobile Device," which is incorporated herein by reference in its entirety.

BACKGROUND

Aspects of the disclosure relate to mobile applications for a mobile device. One or more aspects of the disclosure relate to improving user interaction with mobile applications by generating and managing three-dimensional renderings and generating a tactile response as a user interacts with the three-dimensional renderings on a screen of the mobile device.

In recent years, users have become increasingly reliant upon their mobile devices to perform different aspects of their daily lives. Mobile applications have been created to take advantage of a capacitive touchscreen interface available with many makes and models of these mobile devices. Such applications allow a user to perform electronic banking activities, message and interact with other individuals, and utilize other productivity and/or entertainment functions. However, these mobile device screens provide user interface screens that appear flat or otherwise only provide a two-dimensional experience. While a three-dimensional experience may be available with some applications, the applications providing such a three dimensional viewing experience require one or more of specialized images captured using a three-dimensional camera and/or images processed using specialized three-dimensional software and require specialized three-dimensional glasses for the user to experience these three-dimensional images. However, most users prefer to not continuously wear these three-dimensional glasses only to experience the three dimensional interface. Further, while such images may be viewed in three dimensions, any tactile interface with the mobile device remains the same, with a user contacting a flat surface of the viewing screen without tactile feedback when the user would expect to contact a three-dimensional image. As such, a need has been recognized to provide a three-dimensional viewing experience on a two dimensional display of a user's mobile device that changes with small movements of the mobile device and with or without haptic feedback to simulate the sense of touch that would normally accompany a user interacting directly with a displayed three dimensional object.

SUMMARY

The following presents a simplified summary in order to provide a basic understanding of some aspects of the disclosure. The summary is not an extensive overview of the disclosure. It is neither intended to identify key or critical elements of the disclosure nor to delineate the scope of the disclosure. The following summary merely presents some concepts of the disclosure in a simplified form as a prelude to the description below.

Aspects of the disclosure provide effective, efficient, scalable, and convenient technical solutions that address and overcome the technical problems associated with accurately evaluating instruments for authenticity and validity.

A three dimensional user experience for mobile applications includes adjusting display of simulated three dimensional objects in real time and providing tactile feedback based on user interaction. A mobile application identifies a user viewing angle of a user and an orientation of the mobile device. An image analyze calibrates coordinates of the user with respect to the mobile device position and calculates pitch and roll elements of the simulated three dimensional objects with respect to a mobile device coordinate system. Based on rotational element, images are selected and/or rendered for display in real time. The mobile application analyzes an area of contact with a touchscreen and identify an edge of a selected simulated three dimensional object based on a color or color gradient. Based on a type of object and an edge type, tactile feedback is generated by triggering a vibration motor to execute a particular vibration pattern.

In some cases, a mobile device may include a camera, a touchscreen, at least one processor, and a memory storing instructions and/or images or image components. The mobile device may display a plurality of simulated three dimensional objects on a user interface screen displayed on the touchscreen when running a mobile application. The mobile application may identify a first user viewing angle corresponding to a user's view of the touchscreen based on an image of the user's face captured by the camera, identify an orientation of the mobile device, and generate based on the first user viewing angle and the orientation of the mobile device, a three dimensional rendering of a simulated three dimensional image object. The mobile application may then present, via the user interface screen, the simulated three dimensional image object. Such updates may occur in real time and/or at a discrete update rate giving the appearance of real time updates.

In some cases, the mobile device may include a gyroscope that may generate a real time signal corresponding to an orientation of the mobile device. This orientation may be matched with user line of sight information identified from images based on a time of capture for each signal and/or image. In some cases, the mobile device, based on activation of the mobile application program, may initiate an initial capture of the user's image and an initial capture of the orientation of the mobile device and calibrate a three-dimensional rendering engine to present one or more three dimensional image objects to the user via the user interface screen. In some cases, an identification of a second user viewing angle may be done at a time after an identification of the first user viewing angle, where the mobile device may then determine whether a viewing angle change occurred between the first viewing angle identification and the second viewing angle capture and generate an adjustment to the three dimensional rendering of a simulated three dimensional image object based on an angular difference between the first viewing angle and the second viewing angle.

In some cases, the mobile device may continuously monitor an angle at which a user views the user interface screen based on a series of images captured by the camera, which may include a still camera, a video camera, an infrared camera or the like, and generate adjustments to the three dimensional rendering of the simulated three dimensional image object based on angular differences identified between subsequent time periods. In some cases, the mobile device may generate adjustments to the three dimensional rendering of the simulated three dimensional image object based on a change of orientation of the mobile device between subsequent time periods. In some cases, the mobile device may continuously monitor the orientation of the mobile device with respect to a coordinate system associated with the mobile device and generate adjustments to the three dimensional rendering of a simulated three dimensional image object based on orientation differences identified between subsequent time periods. In some cases, the mobile device may generate haptic feedback to a user in response to contact with the touchscreen adjacent the image objects.

Aspects of this disclosure describe methods of providing tactile feedback with respect to user interaction with a simulated three dimensional user interface screen. A mobile device may present, at a user interface screen, one or more simulated three dimensional objects, the simulated objects spatially distributed on the user interface screen, sense via a touchscreen displaying the user interface screen, physical contact with at least apportion of the touchscreen and adjacent to at least one of the one or more simulated three dimensional objects, and generate haptic feedback corresponding to the physical contact touching at least a portion of the touchscreen associated with the one or more simulated three dimensional objects. In some cases, the mobile device may identify an area of physical contact on a surface of the user interface screen, analyze sensor signal corresponding to a location of the area of physical contact, and select a simulated three dimensional object of a plurality of simulated three dimensional objects associated with the physical contact. In some cases, the mobile device may analyze a selected simulated three dimensional object to identify an edge of the three dimensional object and send a command, to a vibration motor, to initiate a vibration patter associated with the identified edge. In some cases, the mobile device may include a vibration motor, where the haptic feedback corresponds to a vibration of a vibration motor associated with a portion of the one or more simulated three dimensional objects. In some cases, generating of the haptic feedback may include analyzing a gyroscope signal corresponding to an orientation of a mobile device associated with the touchscreen, identifying, based on a color or color gradient of a simulated three dimensional object, an edge of the simulated three dimensional object that is adjacent an area of physical contact of the touchscreen, and triggering a vibration pattern of a vibration motor associated with the orientation of the mobile device and the identified edge of the simulated three dimensional object.

In some cases a mobile device may initiate capture, by a camera of the mobile device, a series of images of a face of a user viewing the user interface screen to determine a user viewing angle based on each image of the series of images, wherein each image is associated with a time period. The mobile device may analyze a gyroscope signal to determine an orientation of the mobile device in real time to perform real time modification of pitch and roll characteristics for each of a plurality of simulated three dimensional objects based on the determined viewing angle and orientation of the mobile device. In some cases, the mobile device may enhance the user experience by generating by a speaker of a mobile device, audible feedback of a user selecting one of the plurality of simulated three dimensional objects. In some cases, a vibration pattern of the haptic feedback corresponds to an edge type of a simulated three dimensional object adjacent to an area of physical contact with the user interface screen.

In some cases, the mobile device may display on the user interface screen, a simulated three dimensional object comprising a button, wherein the button is shown to be in a first state and, based on an identification that the button is located at an area of physical contact with the touchscreen, modify an image of the simulated three dimensional object showing a change of state from a first state to a second state. The mobile device may then trigger the vibration motor, to operate in a vibration pattern corresponding to the button changing from the first state to the second state. In some cases, the mobile device may display on the user interface screen, a simulated three dimensional object comprising a slider element, wherein the slider element is shown to be in a first position and based on an identification that the slider element is located at an area of physical contact with the touchscreen, modifying an image of the simulated three dimensional object showing a change of state from a first position to a second position. The mobile device may then trigger a vibration motor to operate in a vibration pattern corresponding to the slider element changing location from the first position to the second position.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which.

DETAILED DESCRIPTION

Figure 1:
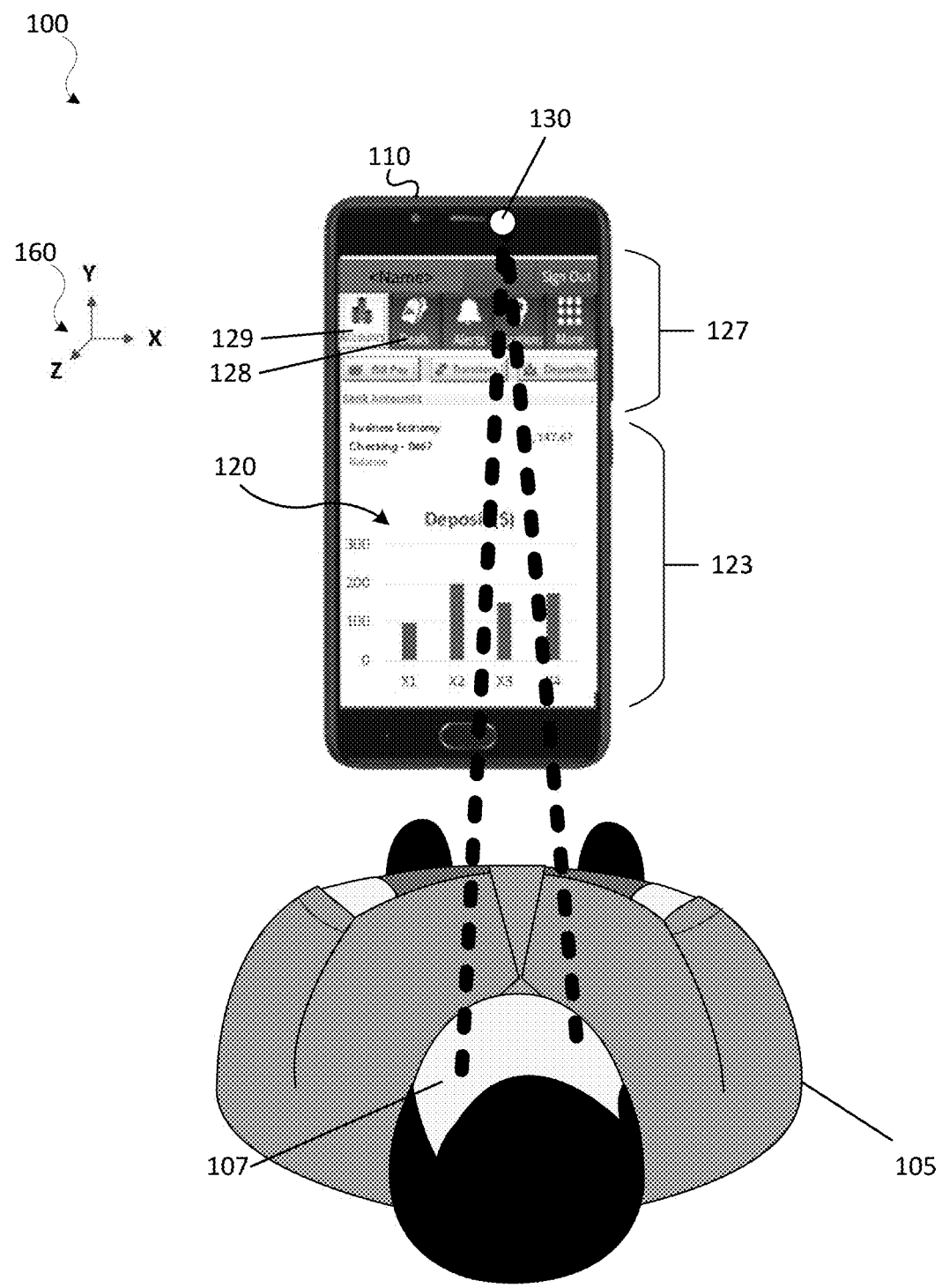
FIG. 1 shows an illustrative computing environment implementing three-dimensional rendering with or without tactile response to a user's touch in accordance with one or more aspects described herein.

In the following description of various illustrative embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

The above-described examples and arrangements are merely some example arrangements in which the systems described herein may be used. Various other arrangements employing aspects described herein may be used without departing from the invention.

To accommodate multiple concurrent development activities, this disclosure describes an illustrative mobile application computing system including a user device running an application processing instructions to provide mobile application users an interactive 3-dimensional (3D) experience without additional device (e.g., 3D glasses, and the like), where the interaction 3D experience may include a touch experience that allow the user to "feel" edges of three dimensional image components. In some cases, the mobile application may provide a 3D look experience to allow users to interact with elements of a real-time 3D user interface without a need to wear glasses or other items when viewing the screen. Additionally, with the help of devices built into or otherwise associated with the mobile device, such as a camera and gyroscope of an illustrative smart phone, a 3D rendering analyzer may calibrate the coordinates of the user with respect to a mobile device's position. Based on the calibrated coordinates, an artificial intelligence and/or machine learning (AI/ML) model may calculate at least the pitch and roll (e.g., rotational elements of an x,y,z coordinate system of the user and/or the mobile device) associated with in-application components and/or images. Based on the calculated rotational elements, relevant images may be selected from an image data store and/or rendered 3D components may be rotated accordingly. Such rotational calculations, image selection and/or image rendering may be calculated quickly in real-time, thus improving the user experience in the 3D mobile application to be more interactive.

In some cases, the above-described 3D mobile application may include a real-time user 3D look and feel experience on a mobile device without additional equipment. For example, when a user touches a mobile device screen adjacent to a rendered 3D image, the AI/ML model may identify a location of an edge and/or profile of an image component. The AI/ML model may identify an edge or profile based on a color or color gradient density of a rendered image, such as a button. When an edge and/or profile of a rendered 3D image is identified, the AI/ML model may provide this information to a controller (e.g., a vibration controller) to coordinate a vibration motor based on a location of a screen touch, identified component edges or profile and/or an axis of a local coordinate system (e.g., a z-axis of a mobile device coordinate system).

In some cases, and depending on the impression, an area of skin touching an image on a capacitive touchscreen, a mobile application may coordinate a sensed touch location with the 3D component (e.g., a 3D image and the like) on the screen, and modify the 3D component with a triggered vibration. For example, upon a user selection of a 3D button image, the 3D button image may be modified along an axis (e.g., the z-axis) along with the vibration, thus presenting the user with a simulated feel of a real button being depressed. In another example, a user may slide a 3D component (e.g., a slider component), a unique vibration may be triggered when the slider moves along the component and/or when the slider is moved to the edge of the component, thus giving a realistic feel to the movement of the 3D component. In some cases, an audio output (e.g., a click, a buzz, and the like) may also be coordinated with the image changes and/or vibrations to more realistically simulate actual components (e.g., buttons, sliders, rocker switches, and the like) with the 3D components displayed on the user interface screen of the mobile device.

FIG. 1 shows an illustrative computing environment 100 implementing three-dimensional rendering with or without tactile response to a user's touch in accordance with one or more aspects described herein. FIG. 1, along with FIGS. 2A and 3A, show an illustrative interactive user 3D experience while using a mobile application on a mobile device. In FIG. 1, the user 105 may hold the mobile device 110 (e.g., a smart phone, a tablet, or the like) at a first viewing angle. In the illustrative example of FIG. 1, the viewing angle may be such that a screen 120 of the mobile device 110 is presented approximately perpendicular to the user 105. For example, a coordinate system 160 associated with the mobile device 110, may be defined such that the y-axis lies along a vertical plane of the mobile device 110, the x-axis lies along a horizontal plane of the mobile device 110, and a z-axis lies along a plane perpendicular to the screen 120 of the mobile device 110. In some cases, a mobile application may have one or more user interface screens capable of displaying one or more 3D components to the user. For example, the illustrative user interface screen of FIG. 1 includes one or more 3D buttons 128, 129. In some cases, one or more 3D components may be distributed over the user interface screen. In some cases, one or more 3D components may be located in a first portion 127 of the user interface screen and a second portion 123 of the user interface screen may include primarily 2-dimensional images.

When the mobile application is active on the mobile device, the mobile application may cause a camera 130 (e.g., a still camera, a video camera, an infrared camera and the like) of the mobile device 110 to capture an image of the user 105 holding the mobile device. Based on the captured image, an image analyzer associated with the mobile application, may detect a location and/or an orientation of the user's eyes 107. Based on this information obtained about the location of the user's eyes with respect to the display screen 120 of the mobile device 110, along with a orientation of the mobile device (e.g., in an associated xyz coordinate system) captured by an internal gyroscope of the mobile device, a viewing angle 168 may be calculated based, at least in part, on a line of sight of the user and an orientation of the mobile device 110. For example, the viewing angle 168 of the mobile device 110 may be approximately perpendicular to the mobile device screen (e.g., along a z-axis of the mobile device coordinate system.

Figure 2B:
FIGS. 2A and 2B show illustrative views of a computing environment implementing three-dimensional rendering in response to a change in viewing angle in accordance with one or more aspects described herein.
Figure 2A:
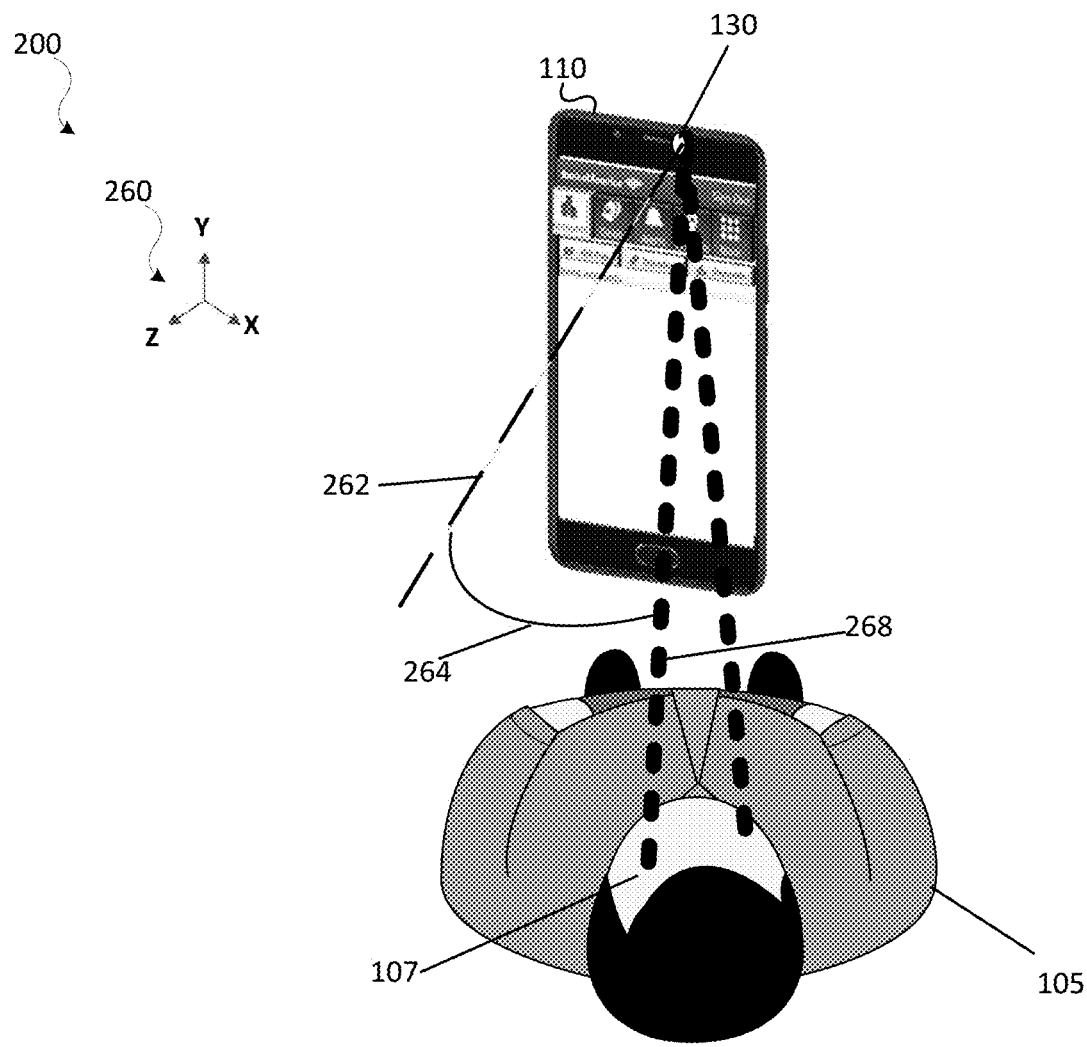

FIGS. 2A and 2B show illustrative views of a computing environment 200 implementing three-dimensional rendering in response to a change in viewing angle in accordance with one or more aspects of the disclosure described herein. In some cases, the mobile application may continuously monitor a location of the user's eyes 107 using the camera 130, along with sensing an orientation of the mobile device 110 by the internal gyroscope of the mobile device 110. In some cases, the mobile application may periodically monitor these parameters, such as by obtaining the user's viewing angle 262 and/or the device orientation on a periodic basis (e.g., about 20 milliseconds, about 50 milliseconds, about 0.5 seconds, about 1 second, and the like). The mobile application may compare a current viewing angle with one or more previous viewing angles to determine a delta 264 between the viewing angle 268 of the user and the z-axis 262 of the mobile device coordinate system 260. As illustrated in FIG. 2A, the delta 264 may be determined after the phone rotates about the y-axis in a negative direction, as shown in the coordinate system 260. In some cases, the delta 264 (e.g., change in angle) of the eye detection may be analyzed with respect to a change in position determined from a current mobile device orientation sampled by the gyroscope and one or more previous orientations of the mobile device. Once the delta viewing angle(s) and/or the delta orientation angle(s) have been determined, the mobile application may use a graphics analyzer to calculate a change in dimension of the 3D objects displayed on the screen, so that the user experiences a 3D effect. When sampling rates are above a threshold rate (e.g., about 200 milliseconds or the like), the user may have a real-time or near real-time 3D visualization experience. FIG. 2B shows a close-up view of a portion of the visualization screen displayed on the mobile device 110. In some cases, the mobile application may adjust multiple 3D objects or components in at least a portion 227 of the visualization screen. Here, FIG. 2B shows an exaggerated view of object embossing for illustrative purposes. Here, the visualization includes a plurality of simulated pushbuttons 229 and 252, where the edge 241 of a button is rendered based on the calculated viewing angle and the orientation of the mobile device 110. In this illustrative example, the push button object 252 is shown in an engaged state and the push button object 229 is shown in a disengaged state.

Figure 3B:
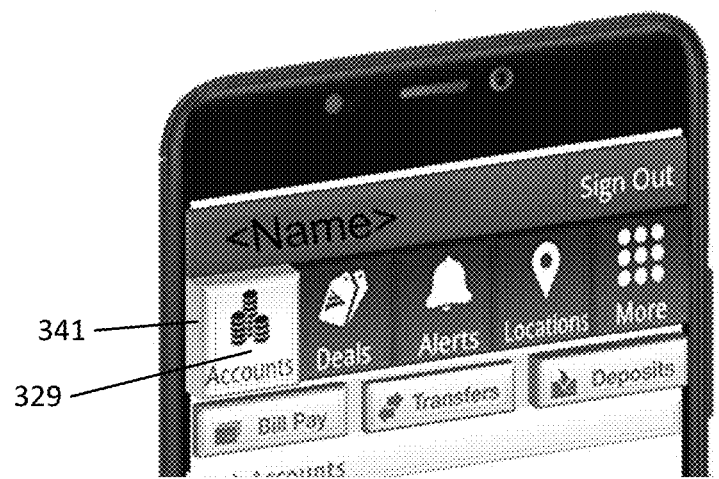
FIGS. 3A and 3B show illustrative views of a computing environment implementing three-dimensional rendering in response to a change in viewing angle in accordance with one or more aspects described herein.
Figure 3A:
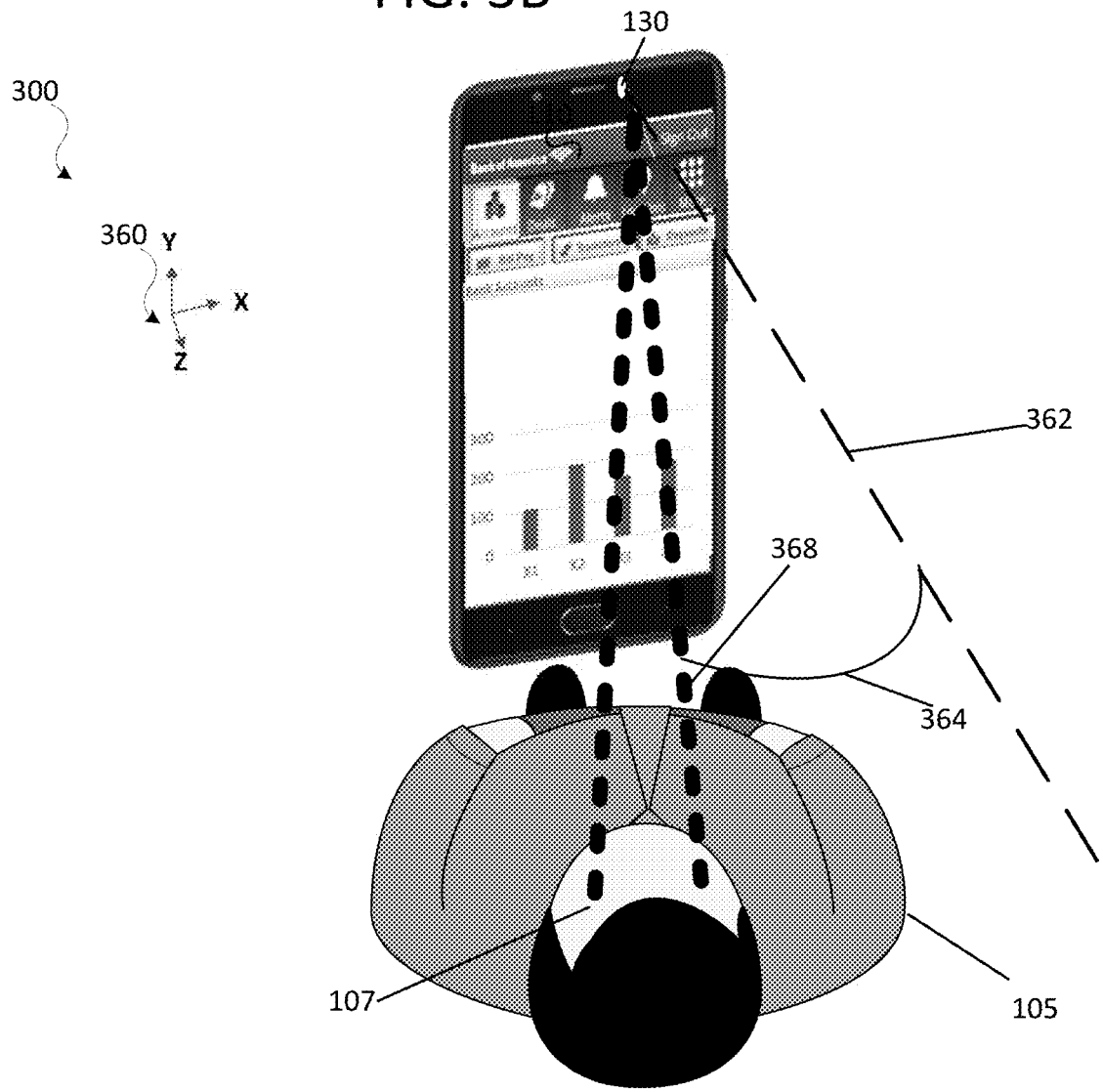

FIGS. 3A and 3B show illustrative views 300 of a computing environment implementing three-dimensional rendering in response to a change in viewing angle in accordance with one or more aspects described herein. Here, the mobile device 110 is shown to be rotated in a positive direction about the y-axis of the mobile device coordinate system 360. Here, the delta angle 364 may be determined between the user viewing angle 368 and the z-axis 362 perpendicular to the screen of the mobile device. Based on the delta 364 and/or a delta orientation of the user device obtained from the gyroscope the mobile device 110, the mobile application may calculate and render 3D objects based on the new phone orientation and viewing angle, as shown in the edges 341 of the illustrative push button 329 of FIG. 3B.

Figure 4:
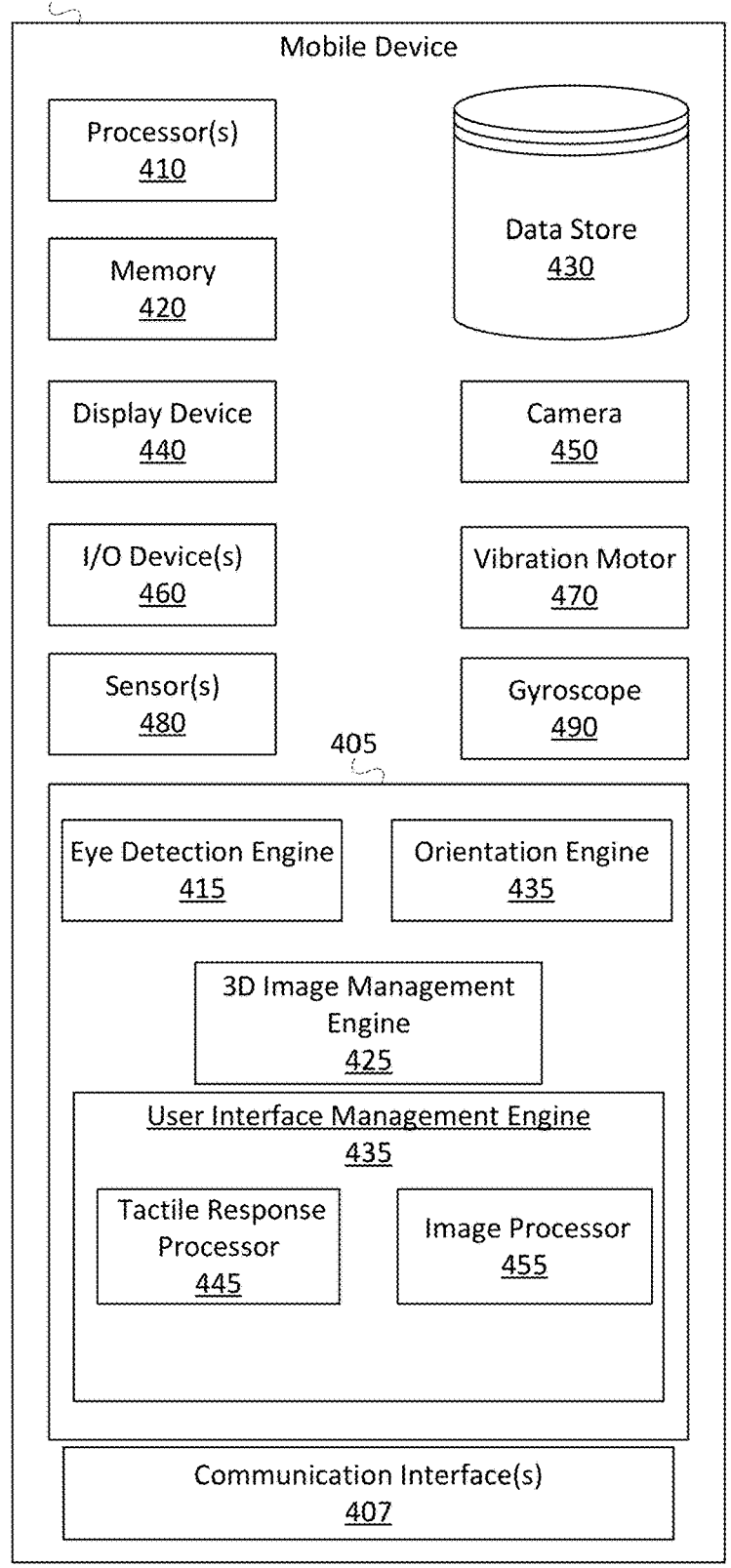
FIG. 4 shows an illustrative block diagram of a mobile device processing a three dimensional rendering application and/or a tactile response application in accordance with one or more aspects described herein.
Figure 5A:
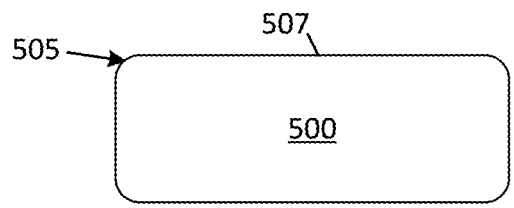
FIGS. 5A-5G show illustrative shapes and edges displayed on a mobile device screen and causing tactile feedback in response to user interaction in accordance with one or more aspects described herein.
Figure 5E:
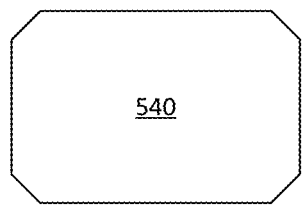
Figure 5B:
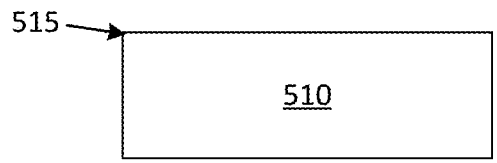
Figure 5C:
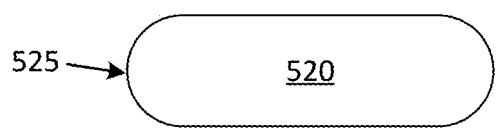
Figure 5F:
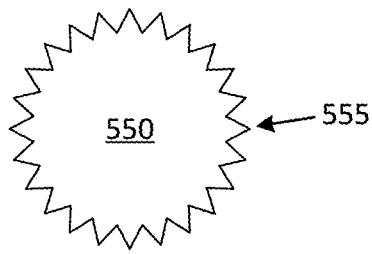
Figure 5D:
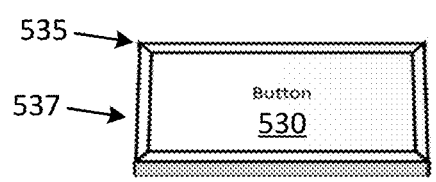
Figure 5G:
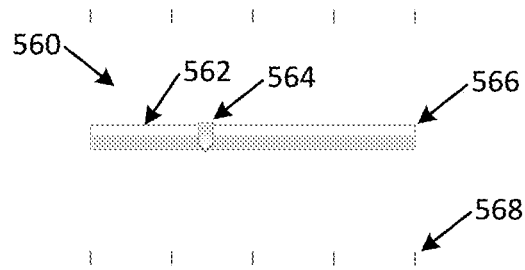

FIG. 4 shows an illustrative block diagram of a mobile device 400 processing a three dimensional rendering application and/or a tactile response application in accordance with one or more aspects described herein. The illustrative mobile device 400 may include one or more processors 410, at least one memory 420, a data store 430, a display device 440, one or more input/output (I/O) devices 460, one or more sensors 480, at least one camera 450, a vibration motor 470, a gyroscope 490, and one or more communication interfaces 407. In some case, the processor 410 of the mobile device 400 may execute instructions stored in the memory 420 to cause the mobile device 400 to run a mobile application 405. In some cases, the mobile application 405 may include an eye detection engine 415, a 3D management engine 425, an orientation engine 435, a user interface management engine 445, a tactile response processor 455 and/or an image processor/rendering engine 465.

In some cases, the mobile device 400 may include the processor 410, or a plurality of processors, for controlling overall operation of the mobile device and its associated components, including the one or more memory devices 420 (e.g., a non-transitory memory device, a random access memory (RAM) device, a read only memory (ROM), and the like), the I/O interface or I/O devices 460, and the like. The mobile device 400 may communicate with one or more external devices, such as a telecommunications network, an external network, one or more external user devices, and the like via the communication interface 407.

The I/O devices 460 may include one or more user interfaces, such as a microphone, a keypad, one or more buttons, one or more switches, a touchscreen, a stylus, one or more pressure sensors, one or more biometric sensors, and/or one or more other sensors (e.g., a temperature sensor, a humidity sensor, and the like) through which a user of the mobile device 400 may provide input, and may also include one or more of a speaker for providing audio output and a video display device for providing textual, audiovisual and/or graphical output. Software, or other executable code segments, may be stored within the one or more memory devices of the memory 420 and/or storage to provide instructions to the one or more processors 410 for enabling the mobile device 400 to perform various actions. For example, the memory 420 may store software used by the mobile device, such as an operating system, application programs, and the associated data repositories (e.g., the data store 430. The various hardware memory units of the memory 420 may include volatile and nonvolatile, removable and non-removable media implemented in any method or technology for storage of information such as computer readable instructions, data structures, program modules or other data. The memory 420 also may include one or more physical persistent memory devices and/or one or more non-persistent memory devices. The memory 420 may include, but is not limited to, RAM, ROM, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by the one or more processors 410.

The one or more processors 410 may include a single central processing unit (CPU), which may be a single-core or multi-core processor (e.g., dual-core, quad-core, and the like), or may include multiple CPUs. In some cases, the one or more processors 410 may have various bit sizes (e.g., 16-bit, 32-bit, 64-bit, 96-bit, 128-bit, and the like) and various processor speeds (ranging from 100 MHz to 5 Ghz or faster). The one or more processors 410 and the associated components may allow the mobile device 400 to execute a series of computer-readable instructions, for example, to receive and/or monitor data received via a network (e.g., the Internet).

In some cases, the mobile device 400 may include the illustrative display device 440 that may be capable of displaying one or more user interface screens 139 on a touchscreen display device. The user interface screens may include screens for displaying information to the user and/or receiving information from the user.

The network connections that may be communicatively coupled to the communication interfaces 407 may include a local area network (LAN) and/or a wide area network (WAN), a wireless telecommunications network, a wired communications network and/or may also include other communications networks. When used in a LAN networking environment, mobile device 400 may be connected to the communications network through a network interface or adapter. When used in a WAN networking environment, the mobile device 400 and/or the communication interface 407 may include a modem or other means for establishing communications over the WAN, such as the Internet, a cellular network, and the like. When used in a wireless telecommunications network, the mobile device 400 may include one or more transceivers, digital signal processors, and additional circuitry and software for communicating with wireless computing devices (e.g., mobile phones, portable customer computing devices) via one or more network devices (e.g., base transceiver stations) in the wireless network.

In some cases, the sensors 480 may include one or more different sensors of one or more types such as a temperature sensor, a humidity sensor, a capacitive touchscreen sensor, an accelerometer, the gyroscope 490, a magnetometer, a global positioning system, a proximity sensor, a barometer, an ambient light sensor, one or more biometric sensors, a fingerprint sensor, and the like. For example, a proximity sensor may include one or more energy sensors, such as an infrared LED and IR light detector, to determine a proximity of the mobile device to external objects. In some cases, the proximity sensor may be used to enable or disable the touchscreen display to avoid unintended inputs. In some cases, the sensors 480 may include one or more sensors associated with the display device 440, such as a touchscreen. These touchscreen sensors may be configured to carry an electrical current at all times. Such capacitive sensors may allow a a change in these electrical signals when the screen is touched. This signal change may be used as an input for the mobile device 400. In some cases, the touchscreen sensor may be a capacitive touchscreen or a resistive touchscreen.

In some cases, the data store 430 may be used to store information corresponding to a plurality of user interface screens to be displayed via the display device 440. In some cases, the user interface screens may be stored as a complete screen, as a template screen, as a combination of objects to be assembled into one or more user interface screens, or a combination of the foregoing. For example, an illustrative user interface screen may include a background, one or more foreground objects, such as an input object (e.g., a button component, a slider component, a radio button component, and the like). In some cases, one or more user interface screens may be configured as a two dimensional user interface screen including a plurality of two dimensional objects (e.g., text fields, flat graphics objects, and the like), as a three dimensional user interface screen including a plurality of three dimensional objects (e.g., a 3D button object, a 3D slider, a text entry field including a depth indicator, and the like), or as a combination of two dimensional objects and three dimensional objects, such as the illustrative user interface screen shown in FIGS. 1, 2A, and 3A. In some cases, each of the user interface screens stored in the data store 430 may be associated with a same mobile application 405. The mobile application 405 may modify one or more user interface screens based on inputs received via one or more sensors, camera(s) and/or the gyroscope 490, such as by the user interface management engine 445.

The camera 450 may include one or more different cameras and/or video capturing functionality. For example, the camera may include a video camera, a still image camera, and/or an infrared camera. The vibration motor 470 may be used to attract a user's attention to one or more different functionalities provided by the mobile device 400. In some cases, the vibration motor 470 may be an eccentric rotating mass vibration motor (ERM) that uses a small unbalanced mass (e.g., an eccentric weight) mounted on a DC motor. When the ERM turns, it turns it creates a centrifugal force that translates to vibrations of the ERM and anything associated with the ERM. In some cases, the vibration motor may be a linear vibration motor that contains a moving mass attached to a wave spring, which creates a force when driven. In some cases, one or more other haptic devices may be used to create a tactile experience for the user.

The gyroscope 490 may include a device capable of being able to measure the rate of rotation around one or more different axes. For example, when gauging the rate of rotation around one or more axes of a coordinate system associated with the mobile device 400, the gyroscope may identify an actual value until the mobile device is stabilized. Based on angular momentum, the gyroscope 470 may be used to indicate an orientation of the mobile device with respect to one or more coordinate systems, such as a three-axis coordinate system associated with the mobile device. An illustrative gyroscope 490 may include a three-axis micro electromechanical system (MEMS) gyroscope device.

The mobile application 405 may initiate an eye detection engine 415 upon opening of the 3D enabled application. The eye detection engine 415 may enable the camera 450 to capture a video stream or images of the user on a continuous, nearly continuous, or periodic basis. The eye detection engine may receive one or more images from the camera and process the images using a facial recognition algorithm capable of isolating a location of one or both eyes of the user of the mobile device. For example, an illustrative facial recognition algorithm may identify facial features by extracting information corresponding to one or more facial features from the image of the user's face. For example, to extract facial features, the illustrative facial recognition algorithm may analyze the shape and size of the eyes, the size of nose, and its relative position with the eyes, or the like. In some cases, the eye detection engine 415 may be capable of identifying a direction in which the user is looking with respect to a location of the camera and/or may be capable of identifying a relative distance from the user's face to a surface of the phone in which the camera is affixed. Based on this information, the eye detection engine 415 may store image information in the data store and may be used by an AI engine to improve the speed and/or accuracy of the facial recognition algorithm. For example, the eye detection engine 415 may first look for a match between a captured image and a stored image and may compare an orientation or distance relative to the camera based on an estimation of a change in distance between the stored image and the captured image. In some cases, the eye detection engine may store eye pair position information in a data structure stored in the data store 430 and may further associate each identified eye pair with a time stamp of when the image was captured and/or analyzed. In some cases, an orientation engine 435 may be used to capture and evaluate sensor signals received from the gyroscope to identify a three dimensional orientation (e.g., pitch (x), roll (y) and azimuth (z)) of the mobile device 400. Such information may be processed continuously, in near real time or periodically and stored in the data store 430 with a time stamp corresponding to a time at which a particular orientation was captured.

The user interface management engine 445 may process eye pair information and mobile position information to determine a relative position and orientation of the touchscreen display and the mobile device with respect to a line of sight view of the user. Based on this information, the user interface management engine 445 may process this orientation information and eye pair position information using a static model and/or a machine learning model to calculate an image rotation and/or for calibration of the user interface screen objects for display to the user. The 3D image management engine 425 may process three dimensional objects and/or images for display on the display device and provide such objects to the user interface management engine 445. In some cases, the user interface management engine may match a current eye pair position and a current mobile device orientation based on their corresponding time stamps. In some cases, a match may be determined based on matching time stamps of the eye pair information and the mobile device orientation information The tactile response processor 455 may identify edges of a displayed 3D component based on a color and or a color gradient associated with an edge of the device. Depending on the edge, shape and current orientation of the component, a vibration may be triggered to be generated by the vibration motor 480. In some cases, the tactile response processor 455 may calculate a speed, a duration and/or a power of a vibration to be initiated, based on a speed that a user's finger is moving relative to a displayed 3D object, a state of the 3D object (e.g., an engaged state of a 3D button, a disengaged state of the 3D button, and the like), and an edge location at which the user's finger approaches the displayed 3D object.

FIGS. 5A-5G show illustrative shapes and edges displayed on a mobile device screen and causing tactile feedback in response to user interaction in accordance with one or more aspects described herein. Unlike physical objects, a virtual object such as a 3D component object may be of any shape desired by a user interface designer. The size, shape and perceived depth of a 3D component may all factor into a vibration pattern, vibration force and vibration duration triggered to be generated by the vibration motor. For example, a 3D component 500 may have a rounded corner edge 505 and a straight edge 507. A rectangular 3D object 510 may have one or more corners that are approximately a right angle. Such corner edges may be associated with a short duration vibration pattern having a sharp initial force, while the rounded edges 505 and 525 of object 520 may be associated with a vibration pattern of a similar duration, but a softer force. Objects 540 with a flattened corner 545 or straight edge 507 may be associated with a longer duration vibration patter with a softer force. In some cases, custom objects may be generated, such as the illustrative star button object 550 having a plurality of points 555. A vibration pattern associated with an edge of the star button object 550 may include a short, sharp force having an extremely short duration. In some cases, a three dimensional object 530 may comprise one or more other three dimensional features, such as a bezel or a height associated with a state of the three dimensional object. A vibration pattern may be generated, not only for each edge of the object, but the force may be different depending on which edge of the displayed object is touched by the finger of the user, the perceived size of a secondary feature of the object such as a bezel and/or the state of the 3D component object.

Figure 6:
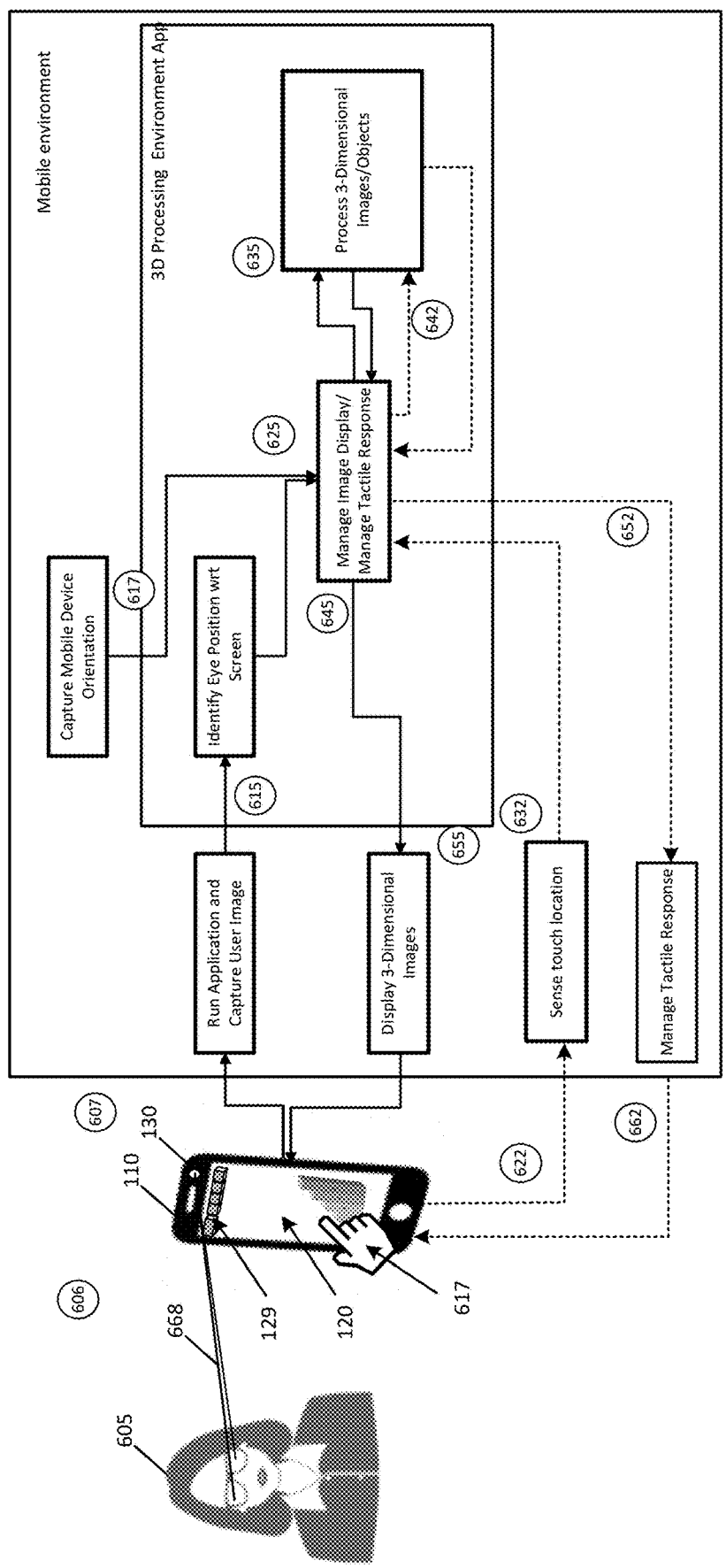
FIG. 6 shows an illustrative block diagram of a method for providing three dimensional rendering with our without tactile feedback in accordance with one or more aspects described herein.

FIG. 6 shows an illustrative block diagram of a method 600 for providing three dimensional rendering with our without tactile feedback in accordance with one or more aspects described herein. At 60, the user 605 may activate an application on the mobile device 110 and at 607, the eye detection engine may 415 may initiate capture of an image of the user 605 by the camera 130 for identification of a current line of sight 668 of the user towards the display (e.g., the touchscreen 120) along with an associated time stamp. Such image capture may be performed periodically or continuously by the eye detection engine 415 as long as the mobile application is active on the mobile device 400. The display may include one or more 3D component objects (e.g., the buttons 129).

At 615, the eye detection engine may analyze a current eye pair position with respect to the camera, such as identifying a location of the user's eyes within a frame of a captured image. The eye detection engine may then analyze a current eye pair position of the user identified from an image having a most recent time stamp and comparing that location to a determined eye pair position identified in one or more images captured at one or more previous times. In doing such a comparison, the eye detection engine may identify whether a change in the user's line of sight has occurred, thus signifying that the mobile device has moved with respect to the user. This change of position, e.g., an eye pair position delta, may be stored, along with a time stamp for use in selecting and/or rendering one or more simulated three dimensional image components for presentation to the user on a user interface screen.

At 617, the orientation engine 435 may capture a three dimensional orientation of the mobile device 110. Such orientation information may be stored along with an associated time stamp, such as in a data structure stored in the data store 430. The orientation information may include roll (x) position, a pitch (y) position, and a yaw (azimuth) (z) position of the mobile device 110 at a particular time.

At 625, the user interface management engine 445 may process line of sight information identified from one or more images captured of the user, the determined eye pair position delta of the user captured at one or more times, including the most recent captured eye pair position delta along with an orientation of the mobile device 110 determined from the position data sensed by the gyroscope. In some cases, the user interface management engine 445 may process current line of sight information, current eye position delta information, and current device orientation of the mobile device 110 using one or more models, such as a static model or a machine learning based model, to calculate a rotation of an image or image component, such that the image or image component can be rendered or otherwise presented to the user 105 in a seamless 3D image presentation on the touchscreen 120 of the mobile device 110. In some cases, such as on power up of the mobile device, activation of the mobile application, or upon switching focus from a different application to the mobile application, the user interface management engine may process initially captured eye position data to perform a calibration of the images to be presented to the user. In some cases, the calibration may take place while the mobile application initiates (e.g., while a splash screen is being displayed) or in a time period between the mobile device switching display from the different application to the mobile application. In some cases, the static model may have formulas that may calculate an angle of presentation of simulated 3D imagery (e.g., a depth of a button, and the like) based on a detected position of the user's eyes and/or the current orientation of the mobile device. As such, the angle of presentation information may be used to select, or otherwise render, images of 3D image objects, such a buttons and sliders, that may be presented to the user via the user interface screen. In some cases, a machine learning model may process the eye position data, the line of sight data, the eye position delta information, a mobile device orientation information using one or more machine learning model approaches, such as tree based algorithms, linear regression based algorithms, a Bayesian network algorithm or the like. In some cases, the machine learning models may adjust the models based on feedback received from touch information captured when a user selects an object on the user interface screen. For example, the machine learning model may modify an angle of presentation of an image object or a group of image objects based on information corresponding to where the user has pressed the user interface screen when selecting the object. In an example, a machine learning model may be based on a premise that the user desires to select a three dimensional object by pressing within a position window centered about a center of a simulated three dimensional object. The machine learning model may modify the angle of presentation in response to a determined difference between a center of the rendered object and the actual position touched on the screen relative to the center of the rendered object.

At 635, the 3D image management engine 425 may process or otherwise identify one or more image objects based on rotation information and/or an angle of presentation information calculated by the user interface management engine 445. In some cases, the 3D image management engine 425 may load or otherwise select user interface screen objects from the data store 430. In some cases, the data store 430 may store multiple versions of a simulated three dimensional image object (e.g., a button, a slider, or the like), where each version of the simulated three dimensional image object may represent the same object viewed as if viewed from different angles. In some cases, the 3D image management engine 425 may select a particular image to be presented to the user based on current rotation information determined by the user interface management engine in near real time so that, when presented to the user, the simulated 3D image appears to be a seamless presentation as the mobile device moves in relation to the user. In some cases, the 3D image management engine 425 may load, or otherwise identify, one or more base images of the simulated 3D image components. The 3D image management engine may provide a reference to the identified image components to the user management engine 445 for further processing.

At 645, the image processor 465 of the user interface management engine 445 may process images stored in the data store 430 as identified by the 3D image management engine 425. For example, the image processor 465 may load an image object identified by the 3D image management engine 425 and forward the object to an image displayer (not pictured) for display to the user at 365. In some cases, the image processor 465 may individually process each 3D image object associated with a particular presented user interface screen. In some cases, the image processor 465 may be configured for real-time or near real-time processing of images. In some cases, the image processor 465 may be configured to process images after sensing a change in orientation of the mobile device, a change in a viewing angle for a user, or a combination of the foregoing. The image processor 445 may process image objects to be displayed on a user interface and/or may perform rendering of the image objects based on the information received from the user interface management engine 425, such that the rendered 3D image object appears as a seamless presentation of a simulated 3D objects on the user interface screen. At 655, the user interface management engine 445 may cause the plurality of simulated 3D image objects to be displayed for user interaction with the mobile device 110.

At 622, the user 605 may interact with one or more simulated 3D image objects (e.g., the buttons 129) displayed on the mobile device 110, such as by touching the touchscreen 120 with a finger, a stylus or other such tool capable of being sensed by the touchscreen sensor. At 632, the touchscreen sensor may generate a signal corresponding to a location at which a user touched the touchscreen, such as by using an array of individual sensors arranged adjacent to the screen 120. In response to sensed contact with the touchscreen, a signal representative of the touched coordinates (e.g., an x-y position on the surface of the mobile device) may be sent for analysis by the user interface management engine 445 of the mobile application 405 at 642. Based on the coordinates of the sensed touch and information corresponding to locations of 3D image objects on the user interface screen of the mobile device, the 3D image management engine may load touch-based information corresponding to the 3D image object located at the sensed coordinates. Such touch-based information may include, among others, an object type parameter (e.g., a button, a slider, a radio button, and the like), an object parameter (e.g., a length parameter, a width parameter, a depth parameter, a height parameter, a slider length, an edge type, a surface type, a color parameter, a color gradient parameter, and the like), tactile response parameters (e.g., a vibration pattern, a vibration length, a vibration strength, and the like). This information may be stored in, and retrieved from, a data store such as the data store 430.

At 652, a machine learning algorithm may analyze the touch-based information associated with the 3D object type(s) at or near the coordinate locations. In some cases, the touch coordinates may indicate a point on a surface of the simulated 3D image object, a point at or near an edge of the simulated 3D image object, a point over a two dimensional image, a point at or near an edge of two or more different 3D image objects and the like. In some cases, such a determination may be done by analyzing a location of each 3D image objects as arranged over a surface of the user interface screen by the tactile response processor 455. In other cases, the tactile response processor 455 may identify which one or more image objects may be located at or at least within a specified distance (e.g., 4 millimeters, an area similar to an average surface area of a human fingerprint, or the like) of the coordinates of the touched point on the surface of the touchscreen 120. In some cases, the tactile response processor 455 may then perform an edge analysis, such as by using an image processing algorithm, to identify at least one edge of one or more 3D image objects within the specified distance of the touched point, such as by using a color or color gradient associated with an edge of one or more particular 3D image objects at or near the desired coordinates. Edge detection of an image of one or more particular 3D image objects may include processing the image using one or more direct or indirect edge detection methods including, for example, a special difference filter, a polynomial fitting method, a deformable model, and/or one or more adaptive models. In some cases, an edge detection algorithm may analyze colors of one or more 3D image objects at least partially located within the identified area of contact with the surface of the touchscreen 120. For example, color, shading and/or other definition of an edge, a bezel, a depth indication of a 3D object may be defined and stored as parameters in the data store 430. If, upon repeated analysis of similar object, the tactile response processor 455 identifies that an object is being touched an identified distance from the center of the object, the user interface management engine 445 may calibrate the machine learning algorithm to adjust one of a calculation of a line of sight of the user, a location of 3D display objects on the user interface screen, a matching algorithm matching the identified touched point on the user interface screen with the location of 3D image objects as displayed on the user interface screen, or the like.

Based on an identified edge or surface point of a 3D image object, the tactile response processor may calculate a vibration command to be sent to vibration motor 470 of the mobile device 400. For example, each edge type associated with a 3D image object may correspond with one or more different vibration patterns, vibration strengths, and/or vibration lengths depending on one or more parameters of the 3D image object and/or an orientation of the object, such that user interaction with a simulated 3D object may resemble or otherwise mimic user interaction with a similar physical object. In some cases, the tactile response processor 455 may calculate a different vibration pattern associated with an edge type (e.g., a sharp corner 515, 555, a bezel 535, a depth of a 3D image object 537, a rounded corner 505, 525) a surface feature (e.g., a flat surface of a button (e.g., component 500), a rounded surface of a button, a rough surface, a simulated ridge, an end of a slider 566, a slider knob 564, a slider trach 562, a slider location indicator 568, and the like), an action associated with the simulated object (e.g., a button engagement, a button disengagement, a slider movement, a radio button selection and the like). In some cases, a vibration pattern may include a force, a speed, a duration and/or a movement pattern in which the vibration motor is to be commanded, based on the identified feature of one or more particular 3D image objects. At 662, the user interface management engine 445 may then cause a command to be sent to the vibration motor, triggering a response, in real time or near real time, to a user's touch of a simulated 3D image object presented on the user interface screen of the mobile device. In some cases, multiple vibration commands may be sent, such as when a user slides a finger or stylus along the surface of the user interface and contacts one or more different 3D image objects along a path traveled. In some cases, such as when multiple 3D image objects may be contacted in a single touch (e.g., a touch at an intersection of multiple adjacent buttons), the tactile response processor 455 may calculate a custom vibration pattern based on a combination of vibration patters of each of the multiple 3D image objects touched.

Figure 7:
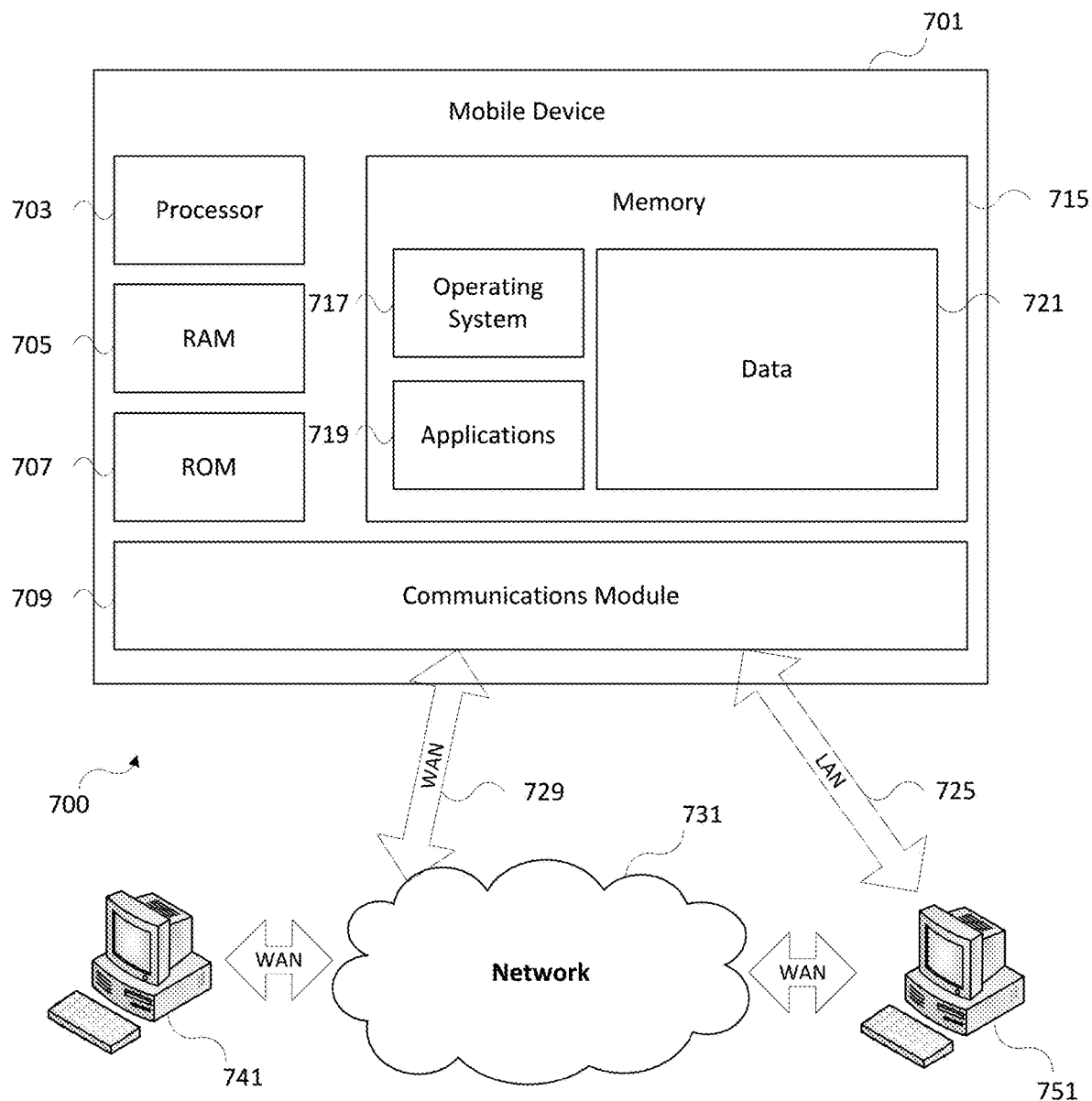
FIG. 7 shows an illustrative operating environment in which various aspects of the disclosure may be implemented in accordance with one or more aspects described herein.

FIG. 7 shows an illustrative operating environment in which various aspects of the present disclosure may be implemented in accordance with one or more example embodiments. Referring to FIG. 7, a computing system environment 700 may be used according to one or more illustrative embodiments. The computing system environment 700 is only one example of a suitable computing environment and is not intended to suggest any limitation as to the scope of use or functionality contained in the disclosure. The computing system environment 700 should not be interpreted as having any dependency or requirement relating to any one or combination of components shown in the illustrative computing system environment 700.

The computing system environment 700 may include an illustrative mobile device 701 having a processor 703 for controlling overall operation of the mobile device 701 and its associated components, including a Random Access Memory (RAM) 705, a Read-Only Memory (ROM) 707, a communications module 709, and a memory 715. The mobile device 701 may include a variety of computer readable media. Computer readable media may be any available media that may be accessed by the mobile device 701, may be non-transitory, and may include volatile and nonvolatile, removable and non-removable media implemented in any method or technology for storage of information such as computer-readable instructions, object code, data structures, program modules, or other data. Examples of computer readable media may include Random Access Memory (RAM), Read Only Memory (ROM), Electronically Erasable Programmable Read-Only Memory (EEPROM), flash memory or other memory technology, Compact Disk Read-Only Memory (CD-ROM), Digital Versatile Disk (DVD) or other optical disk storage, magnetic cassettes, magnetic tape, magnetic disk storage or other magnetic storage devices, or any other medium that can be used to store the desired information and that can be accessed by the mobile device 701.

Although not required, various aspects described herein may be embodied as a method, a data transfer system, or as a computer-readable medium storing computer-executable instructions. For example, a computer-readable medium storing instructions to cause a processor to perform steps of a method in accordance with aspects of the disclosed embodiments is contemplated. For example, aspects of method steps disclosed herein may be executed by the processor 703 of the mobile device 701. Such a processor may execute computer-executable instructions stored on a computer-readable medium.

Software may be stored within the memory 715 and/or other digital storage to provide instructions to the processor 703 for enabling the mobile device 701 to perform various functions as discussed herein. For example, the memory 715 may store software used by the mobile device 701, such as an operating system 717, one or more application programs 719, and/or an associated database 721. Also, some or all of the computer executable instructions for the mobile device 701 may be embodied in hardware or firmware. Although not shown, the RAM 705 may include one or more applications representing the application data stored in the RAM 705 while the mobile device 701 is on and corresponding software applications (e.g., software tasks) are running on the mobile device 701.

The communications module 709 may include a microphone, a keypad, a touchscreen, and/or a stylus through which a user of the mobile device 701 may provide input, and may include one or more of a speaker for providing audio output and a video display device for providing textual, audiovisual and/or graphical output. The computing system environment 800 may also include optical scanners (not shown).

The mobile device 701 may operate in a networked environment supporting connections to one or more remote computing devices, such as the computing devices 741 and 751. The computing devices 741 and 751 may be personal computing devices or servers that include any or all of the elements described above relative to the mobile device 701.

The network connections depicted in FIG. 7 may include a Local Area Network (LAN) 725 and/or a Wide Area Network (WAN) 729, as well as other networks. When used in a LAN networking environment, the mobile device 701 may be connected to the LAN 725 through a network interface or adapter in the communications module 709. When used in a WAN networking environment, the mobile device 701 may include a modem in the communications module 809 or other means for establishing communications over the WAN 729, such as a network 731 (e.g., public network, private network, Internet, intranet, and the like). The network connections shown are illustrative and other means of establishing a communications link between the computing devices may be used. Various well-known protocols such as Transmission Control Protocol/Internet Protocol (TCP/IP), Ethernet, File Transfer Protocol (FTP), Hypertext Transfer Protocol (HTTP) and the like may be used, and the system can be operated in a client-server configuration to permit a user to retrieve web pages from a web-based server. Any of various conventional web browsers can be used to display and manipulate data on web pages.

The disclosure is operational with numerous other computing system environments or configurations. Examples of computing systems, environments, and/or configurations that may be suitable for use with the disclosed embodiments include, but are not limited to, personal computers (PCs), server computers, hand-held or laptop devices, smart phones, multiprocessor systems, microprocessor-based systems, set top boxes, programmable consumer electronics, network PCs, minicomputers, mainframe computers, distributed computing environments that include any of the above systems or devices, and the like that are configured to perform the functions described herein.

Figure 8:
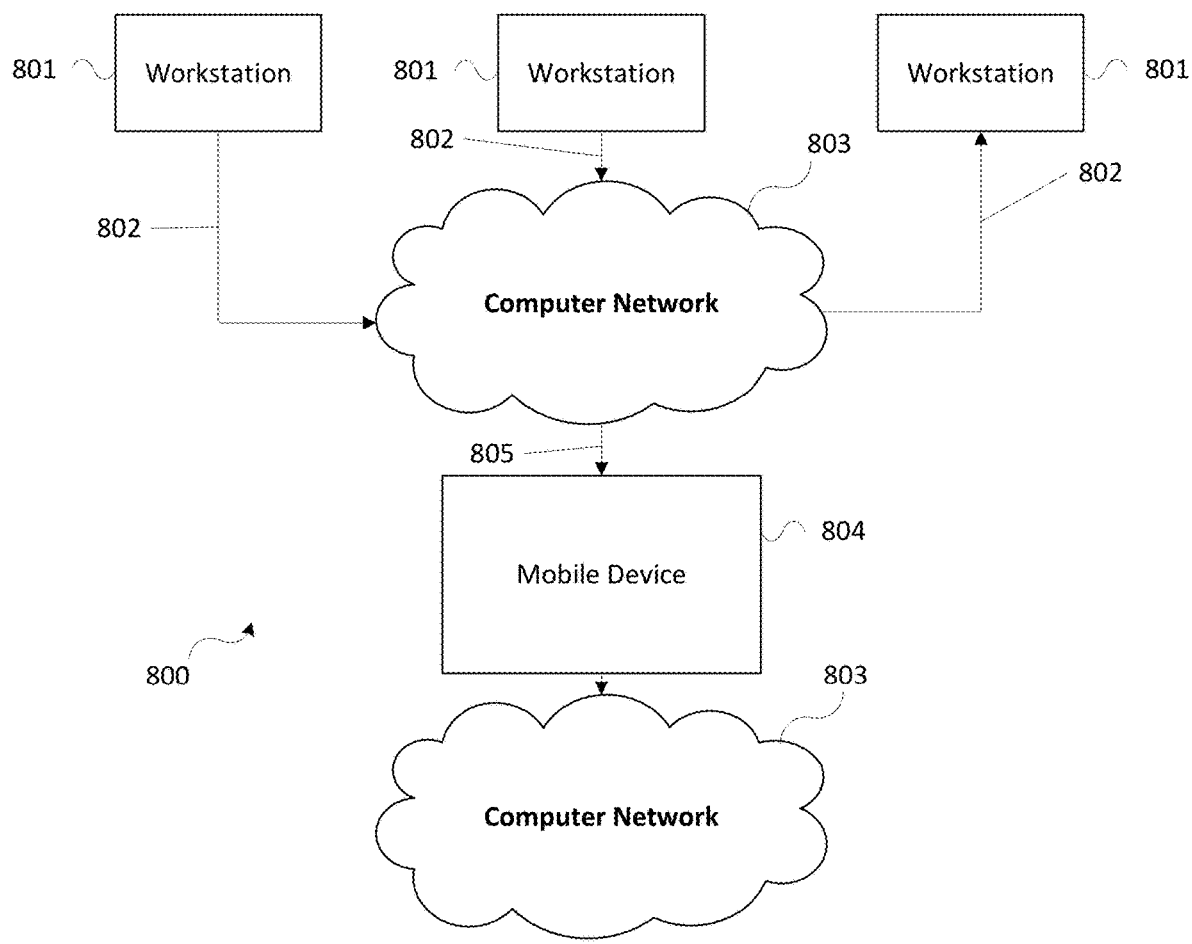
FIG. 8 shows an illustrative block diagram of workstations and servers that may be used to implement the processes and functions of certain aspects of the present disclosure in accordance with one or more aspects described herein.

FIG. 8 shows an illustrative block diagram of workstations and servers that may be used to implement the processes and functions of certain aspects of the present disclosure in accordance with one or more example embodiments. For example, an illustrative system 800 may be used for implementing illustrative embodiments according to the present disclosure. As illustrated, the system 800 may include one or more workstation computers 801. The workstation 801 may be, for example, a desktop computer, a smartphone, a wireless device, a tablet computer, a laptop computer, and the like, configured to perform various processes described herein. The workstations 801 may be local or remote, and may be connected by one of the communications links 802 to a computer network 803 that is linked via the communications link 805 to the mobile device 804. In the system 800, the mobile device 804 may be a server, processor, computer, or data processing device, or combination of the same, configured to perform the functions and/or processes described herein. The mobile device 804 may be used to receive check images and associated data and/or validation scores, retrieve user profile, evaluate the check image compared to the user profile, identify matching or non-matching elements, generate user interfaces, and the like.

The computer network 803 may be any suitable computer network including the Internet, an intranet, a Wide-Area Network (WAN), a Local-Area Network (LAN), a wireless network, a Digital Subscriber Line (DSL) network, a frame relay network, an Asynchronous Transfer Mode network, a Virtual Private Network (VPN), or any combination of any of the same. The communications links 802 and 805 may be communications links suitable for communicating between the workstations 801 and the mobile device 804, such as network links, dial-up links, wireless links, hard-wired links, as well as network types developed in the future, and the like.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, Application-Specific Integrated Circuits (ASICs), Field Programmable Gate Arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, one or more steps described with respect to one figure may be used in combination with one or more steps described with respect to another figure, and/or one or more depicted steps may be optional in accordance with aspects of the disclosure.

What is claimed is:

1. A method comprising:
presenting, at a user interface screen, one or more simulated three dimensional objects, the simulated objects spatially distributed on the user interface screen;
sensing, via a touchscreen displaying the user interface screen, physical contact with at least a portion of the touchscreen and adjacent to at least one of the one or more simulated three dimensional objects; and generating haptic feedback corresponding to the physical contact touching at least a portion of the touchscreen associated with the one or more simulated three dimensional objects, wherein generating the haptic feedback comprises:
analyzing a gyroscope signal corresponding to an orientation of a mobile device associated with the touchscreen;
identifying, based on a color or color gradient of a simulated three dimensional object, an edge of the simulated three dimensional object that is adjacent an area of physical contact of the touchscreen; and
triggering a vibration pattern of a vibration motor associated with the orientation of the mobile device and an identified edge of the simulated three dimensional object.

2. The method of claim 1 comprising:
identifying an area of physical contact on a surface of the user interface screen;
analyzing sensor signal corresponding to a location of the area of physical contact; and
selecting, a simulated three dimensional object of a plurality of simulated three dimensional objects associated with the physical contact.

3. The method of claim 1 comprising:
analyzing a selected simulated three dimensional object to identify an edge of the three dimensional object; and
sending a command, to a vibration motor, to initiate a vibration patter associated with the identified edge.

4. The method of claim 1, wherein the haptic feedback corresponds to a vibration of a vibration motor associated with a portion of the one or more simulated three dimensional objects.

5. The method of claim 1, comprising:
capturing, by a camera of a mobile device, a series of images of a face of a user viewing the user interface screen;
determining a user viewing angle based on each image of the series of images, wherein each image is associated with a time period;
analyzing, by the mobile device, a gyroscope signal to determine an orientation of the mobile device in real time;
modifying, in real time, pitch and roll characteristics for each of a plurality of simulated three dimensional objects based on the determined viewing angle and orientation of the mobile device.

6. The method of claim 1 comprising:
generating, by a speaker of a mobile device, audible feedback of a user selecting one of the one or more simulated three dimensional objects.

7. The method of claim 1, wherein a vibration pattern of the haptic feedback corresponds to an edge type of a simulated three dimensional object adjacent to an area of physical contact with the user interface screen.

8. The method of claim 1 comprising:
displaying, on the user interface screen, a simulated three dimensional object comprising a button, wherein the button is shown to be in a first state;
based on an identification that the button is located at an area of physical contact with the touchscreen, modifying an image of the simulated three dimensional object showing a change of state from a first state to a second state; and
triggering, at a vibration motor, a vibration pattern corresponding to the button changing from the first state to the second state.

9. The method of claim 1 comprising:
displaying, on the user interface screen, a simulated three dimensional object comprising a slider element, wherein the slider element is shown to be in a first position;
based on an identification that the slider element is located at an area of physical contact with the touchscreen, modifying an image of the simulated three dimensional object showing a change of state from a first position to a second position; and
triggering, at a vibration motor, a vibration pattern corresponding to the slider element changing location from the first position to the second position.

10. A mobile device comprising:
a touchscreen display;
a processor;
non-transitory memory storing instructions that, when executed by the processor, cause the mobile device to:
present, at a user interface screen displayed on the touchscreen, one or more simulated three dimensional objects, the simulated objects spatially distributed on the user interface screen;
sense, via a sensor of the touchscreen, physical contact with at least aportion of the touchscreen and adjacent to at least one of the one or more simulated three dimensional objects; and
generate haptic feedback corresponding to the physical contact touching at least a portion of the touchscreen associated with the one or more simulated three dimensional objects, wherein the instructions generate the haptic feedback by causing the mobile device to:
analyze a gyroscope signal corresponding to an orientation of a mobile device associated with the touchscreen;
identify, based on a color or color gradient of a simulated three dimensional object, an edge of the simulated three dimensional object that is adjacent an area of physical contact of the touchscreen; and
trigger a vibration pattern of a vibration motor associated with the orientation of the mobile device and an identified edge of the simulated three dimensional object.

11. The mobile device of claim 10, wherein the instructions, when executed by the processor, cause the mobile device to:
identify an area of physical contact on a surface of the user interface screen;
analyze sensor signal corresponding to a location of the area of physical contact; and
select, a simulated three dimensional object of a plurality of simulated three dimensional objects associated with the physical contact.

12. The mobile device of claim 10, wherein the instructions, when executed by the processor, cause the mobile device to:
analyze a selected simulated three dimensional object to identify an edge of the three dimensional object; and
send a command, to a vibration motor, to initiate a vibration patter associated with the identified edge.

13. The mobile device of claim 10, wherein the haptic feedback corresponds to a vibration of a vibration motor associated with a portion of the one or more simulated three dimensional objects.

14. The mobile device of claim 10, wherein the instructions, when executed by the processor, cause the mobile device to:

capture, by a camera of a mobile device, a series of images of a face of a user viewing the user interface screen;

determine a user viewing angle based on each image of the series of images, wherein each image is associated with a time period;

analyze, by the mobile device, a gyroscope signal to determine an orientation of the mobile device in real time;

modify, in real time, pitch and roll characteristics for each of a plurality of simulated three dimensional objects based on the determined viewing angle and orientation of the mobile device.

15. The mobile device of claim 10, wherein the instructions, when executed by the processor, cause the mobile device to:

generate, by a speaker of a mobile device, audible feedback of a user selecting one of the one or more simulated three dimensional objects.

16. The mobile device of claim 10, wherein a vibration pattern of the haptic feedback corresponds to an edge type of a simulated three dimensional object adjacent to an area of physical contact with the user interface screen.

17. The mobile device of claim 10, wherein the instructions, when executed by the processor, cause the mobile device to:

display, on the user interface screen, a simulated three dimensional object comprising a button, wherein the button is shown to be in a first state;

based on an identification that the button is located at an area of physical contact with the touchscreen, modify an image of the simulated three dimensional object showing a change of state from a first state to a second state; and trigger, at a vibration motor, a vibration pattern corresponding to the button changing from the first state to the second state.

18. The mobile device of claim 10, wherein the instructions, when executed by the processor, cause the mobile device to:

display, on the user interface screen, a simulated three dimensional object comprising a slider element, wherein the slider element is shown to be in a first position;

based on an identification that the slider element is located at an area of physical contact with the touchscreen, modify an image of the simulated three dimensional object showing a change of state from a first position to a second position; and trigger, at a vibration motor, a vibration pattern corresponding to the slider element as the slider element changes location from the first position to the second position.

* * * * *